Oct. 28, 1947.  J. D. COLDWELL  2,429,746
WHEELED LOAD LIFTING VEHICLE
Filed Dec. 30, 1944  3 Sheets-Sheet 1
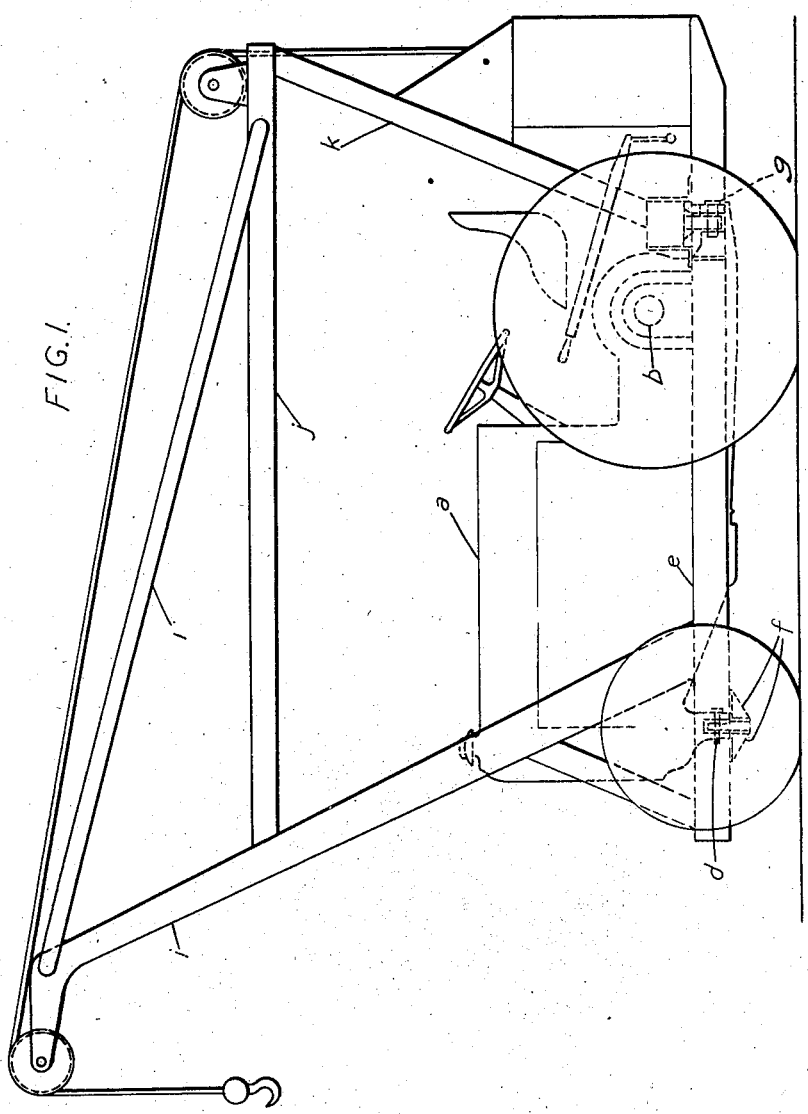
Inventor,
Joe D. Coldwell
By Walter Gunn
Attorney.

Oct. 28, 1947.        J. D. COLDWELL         2,429,746
                WHEELED LOAD LIFTING VEHICLE
            Filed Dec. 30, 1944        3 Sheets-Sheet 2
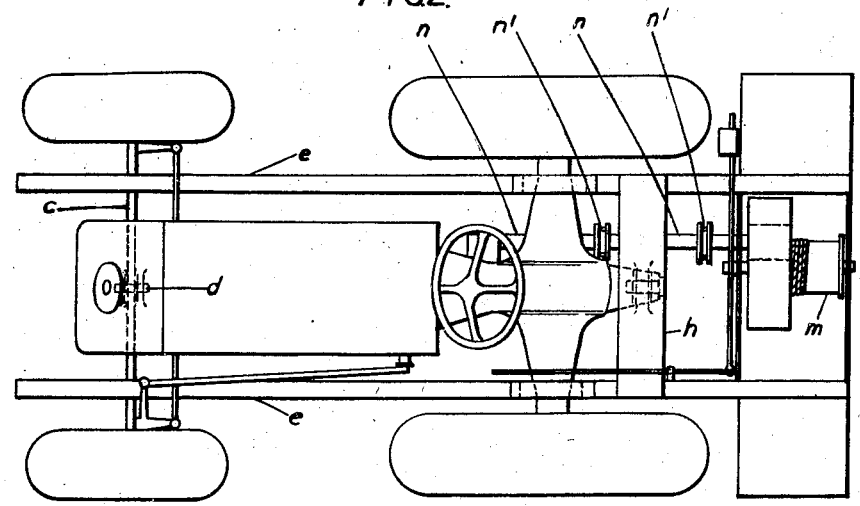
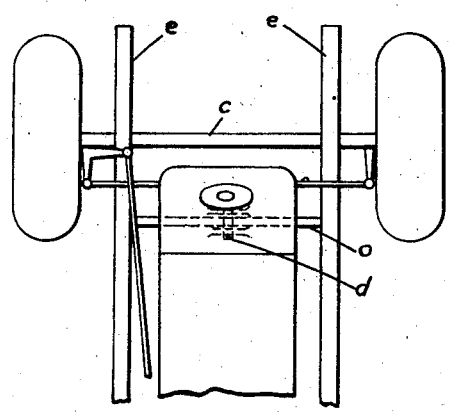
Inventor.
Joe D. Coldwell,
By
Attorney

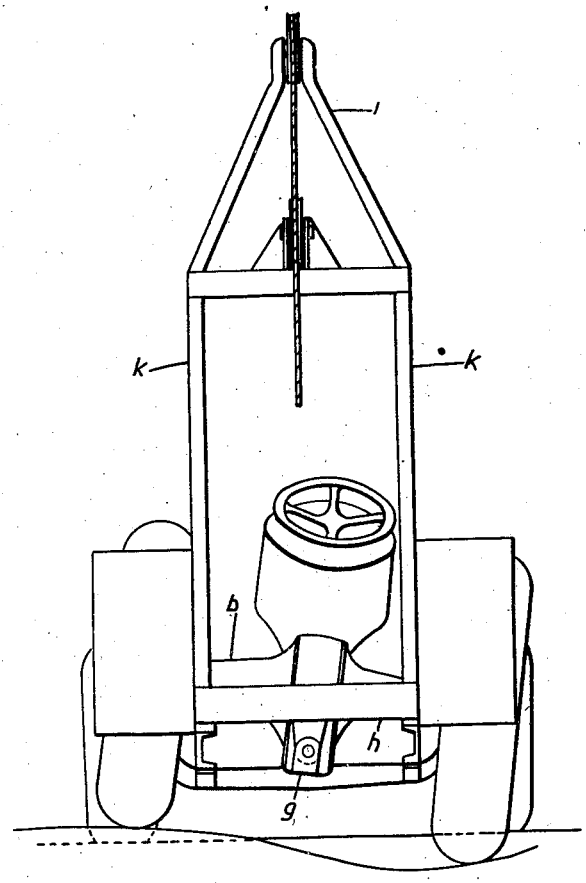

Patented Oct. 28, 1947

2,429,746

UNITED STATES PATENT OFFICE 2,429,746

WHEELED LOAD LIFTING VEHICLE

Joe Davidson Coldwell, Timperley, England

Application December 30, 1944, Serial No. 570,609
In Great Britain January 12, 1944

2 Claims. (Cl. 254—139.1)

This invention relates to wheeled load-lifting vehicles, such as mechanical shovels, cranes, loaders and the like, of the kind comprising a wheeled chassis having the front wheels carried by an axle which is relatively attached to the said chassis as by springs or a pivot, so that the said front wheels may assume different levels, relative to the chassis, to conform with uneven ground levels.

It is the present practice to use a chassis with at least four wheels and to mount the superstructure on the chassis and the chassis on the wheels, so that both are relatively rigid with the rear wheels. In consequence, the lateral stability of the machine as a whole, is controlled by the said rear wheels, but as the rear wheel loads are an inverse function of the load taken by the shovel, or other load-lifting mechanism at the front of the vehicle, the stability of the vehicle when fully loaded is at a minimum. This problem of stability is of major importance and the object of the present invention is to overcome the disadvantages of the present constructions.

According to the invention a wheeled load-lifting vehicle of the kind referred to is characterised in that the superstructure for the shovel, crane or loading mechanism is mounted directly on the said front axle so that its lateral level is controlled thereby.

In a preferred embodiment of the invention, the chassis is power driven and the level of the chassis is controlled by the rear wheels.

In the accompanying drawings:

Fig. 1 is a side elevation of one example of a mobile crane made in accordance with the invention.

Fig. 2 is a plan of Fig. 1.

Fig. 3 is an end elevation of Fig. 1.

Fig. 4 shows a modification.

In the example of the invention shown in the drawings the basis of the machine is a four wheeled power driven tractor, such as that sold under the registered trade-mark "Fordson." Such tractor comprises a unit construction consisting of the engine $a$ with rear axle $b$ and front axle $c$, the latter being pivotally mounted on the pivot pin $d$ to allow the front wheels to follow undulations of the ground independently of the rear wheels. Instead of mounting the superstructure in the usual way rigidly secured to the rear axle and to the unit construction of the engine, gear-box, etc., at the front end, the superstructure is supported by its main longitudinal members $e$ on brackets $f$ fixed to the front dumb axle $c$, whilst a third point of attachment at the rear is provided in the form of a pivotal bracket $g$ on the casing of the rear axle $b$ and brackets on a cross member $h$ between the longitudinal members $e$. In such a power-driven tractor chassis, the dumb front axle, as already stated, is mounted on a central pivot $d$ and forms only a minor part of the chassis. In the present arrangement it forms the major basis of the chassis for the superstructure, and preferably the rear pivot is in line, or substantially in line, with such front pivot in order to eliminate the strain and render a universal joint unnecessary.

The novel structure has the important characteristic of increased stability in operation over rough or irregular ground. As shown in Fig. 3, when the right rear wheel drops into a rut, the center of gravity of the structure is shifted, but because pivot $g$ is below the rear axle, said center cannot reach a position of instability beyond the right hand end of said rear axle except under unusual conditions. As a result, the present arrangement gives considerably greater stability than where said pivot is located above said rear axle.

The superstructure comprises a jib $i$, upper frame members $j$ and $k$ and a tie $l$.

In order that movement of the superstructure relative to the powered tractor chassis shall not affect the haulage mechanism, the winding drum $m$ (see Fig. 2) is mounted on the members $e$ of the superstructure behind the rear wheels and is driven through shafting $n$ with suitable universal joints $n^1$. Alternatively, the drum could be mounted on the powered chassis and the final lead of any haulage cable arranged so that it feeds onto the drum from the superstructure as near as possible in line with the axis of the pivotal movement.

The vehicle chassis may be of the "half-track" type and the expression "rear wheels" as used herein shall be understood to include such construction.

The construction enables the wheel base of the vehicle to be lengthened in a very simple manner. For example (see Fig. 4) it can be imagined that the front axle is allowed to remain where it is relative to the superstructure and the rest of the chassis is moved back. A cross member $o$ is mounted between the longitudinal members $e$ behind the front axle $c$ to receive the pivot brackets and pivot pin $d$ of the chassis. It will be noted that the superstructure in such modification is still mounted direct on the front axle.

What I claim is:

1. A wheeled load-lifting vehicle comprising a wheeled chassis having front and rear axles capable of relative movement to follow difference of ground level and a superstructure including load-lifting means mounted directly on said front axle and pivotally connected to the rear of the wheeled chassis behind the rear axle so that the level of such superstructure is controlled by the front axle, said pivotal connection being below the said rear axle.

2. A wheeled load-lifting vehicle comprising a wheeled chassis having front and rear axles capable of relative movement to follow difference of ground level and a superstructure including load-lifting means mounted directly on said front axle and pivotally connected to the rear of the wheeled chassis behind the rear axle so that the level of such superstructure is controlled by the front axle, said pivotal connection being below and to the rear of the said rear axle, said superstructure having a pair of longitudinally spaced supporting members mounted by brackets on said front axle, said members being attached by a pivotal bracket to the casing of said rear axle.

JOE DAVIDSON COLDWELL.

REFERENCES CITED

The following references are of record in the file of this patent:

UNITED STATES PATENTS

| Number | Name | Date |
|---|---|---|
| 2,363,341 | Lawler | Nov. 21, 1944 |
| 2,322,697 | Lawler | June 22, 1943 |
| 2,199,668 | Lawler | May 7, 1940 |
| 1,911,465 | Poor | May 30, 1933 |
| 1,673,307 | Best | June 12, 1928 |